United States Patent [19]

Abe et al.

[11] Patent Number: 4,572,822

[45] Date of Patent: Feb. 25, 1986

[54] METHOD OF RECOVERING METALS FROM INDUSTRIAL BY-PRODUCTS

[75] Inventors: Hideki Abe, Yachiyo; Hiroshi Tanaka, Musashino, both of Japan

[73] Assignee: Dowa Mining Co., Ltd., Tokyo, Japan

[21] Appl. No.: 587,387

[22] Filed: Mar. 8, 1984

Related U.S. Application Data

[63] Continuation-in-part of Ser. No. 426,205, Sep. 28, 1982, abandoned.

[30] Foreign Application Priority Data

Feb. 15, 1982 [JP] Japan ................................. 57-22482

[51] Int. Cl.⁴ .......................... C01G 3/12; C01G 28/00
[52] U.S. Cl. ......................................... 423/37; 423/42; 423/87; 423/92; 423/98; 423/101; 423/109; 423/140; 423/150; 75/101 R; 75/108; 75/117; 75/118 R; 75/120; 75/121; 204/106; 204/108
[58] Field of Search ............... 75/25, 101 R, 108, 115, 75/117, 118 R, 120; 423/36, 37, 42, 41, 101, 87, 92, 98, 145, 149, 146, 150; 204/106, 108

[56] References Cited

U.S. PATENT DOCUMENTS

| | | | |
|---|---|---|---|
| 2,805,938 | 9/1957 | McGauley | 423/37 |
| 3,816,105 | 6/1974 | McKay et al. | 423/37 |
| 4,049,770 | 9/1977 | Swinkles et al. | 423/37 |
| 4,244,734 | 1/1981 | Reynolds et al. | 423/37 |
| 4,290,865 | 9/1981 | Baczek et al. | 423/37 |

FOREIGN PATENT DOCUMENTS

| | | | |
|---|---|---|---|
| 18940 | of 1894 | United Kingdom | 423/87 |
| 368316 | 3/1932 | United Kingdom | 423/87 |
| 372189 | 5/1932 | United Kingdom | 423/87 |

Primary Examiner—John Doll
Assistant Examiner—Robert L. Stoll
Attorney, Agent, or Firm—Frishauf, Holtz, Goodman & Woodward

[57] ABSTRACT

There is disclosed a novel method of recovering valuable metals from an industrial by-product containing copper and arsenic and at least one metal selected from among lead, zinc, iron, silver and cadmium, said method comprising leaching the by-product with sulfuric acid in an SO₂ gas atmosphere at a temperature of 70° C. or higher in the presence of a solid sulfide to thereby precipitate copper selectively as copper sulfide while dissolving other metal or metals in the leach solution and then separating the copper containing precipitate from the leach solution, said leach solution containing substantially no copper.

19 Claims, 3 Drawing Figures

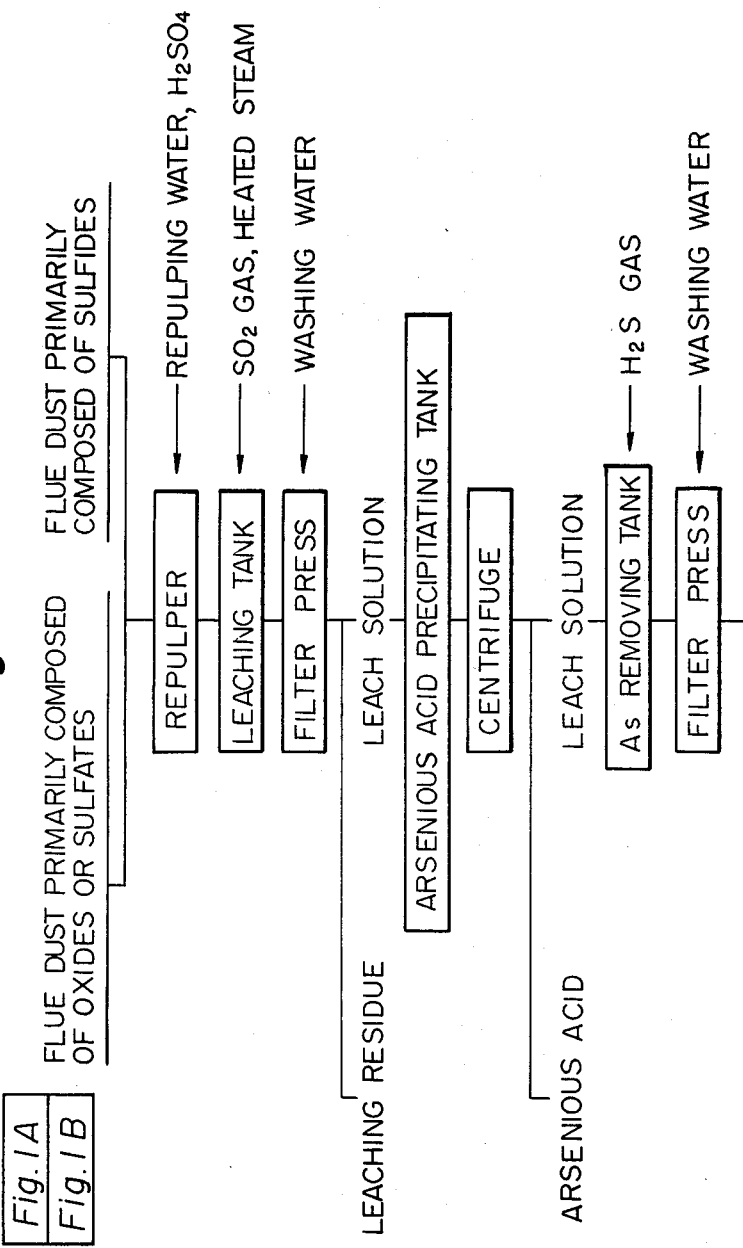

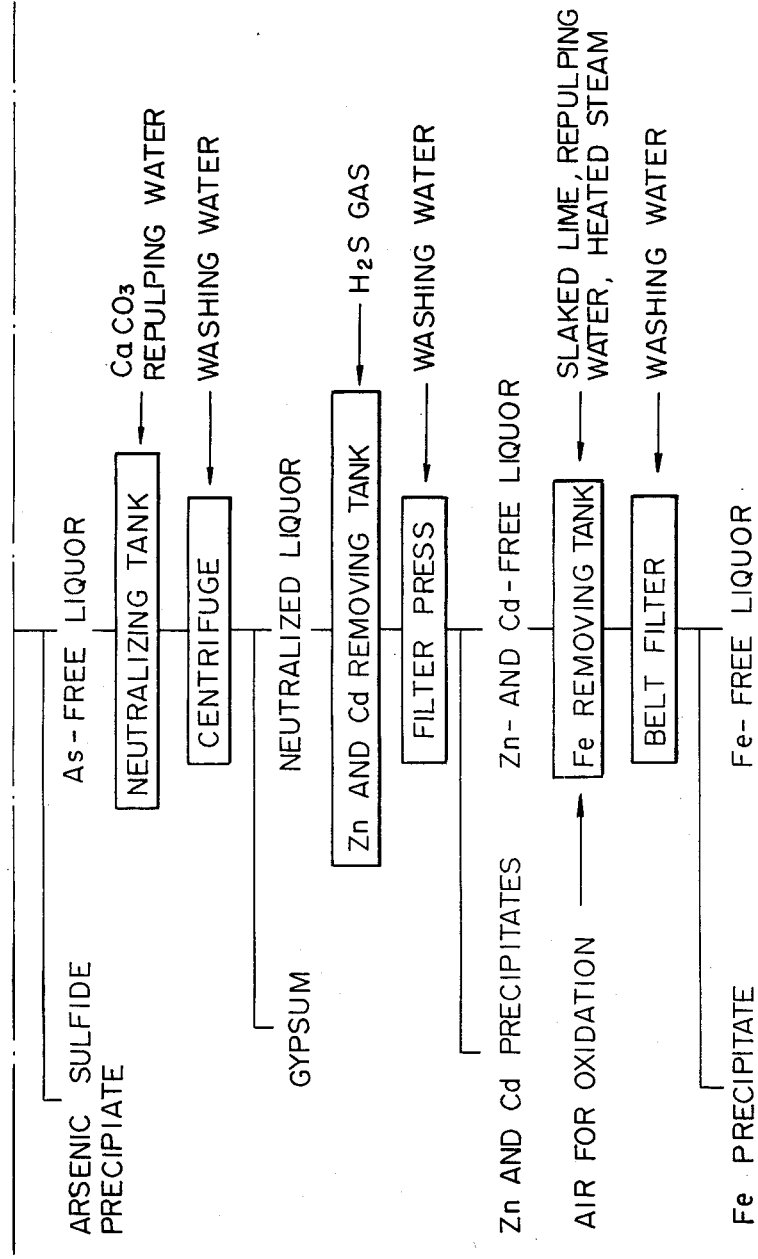

METHOD OF RECOVERING METALS FROM INDUSTRIAL BY-PRODUCTS

This application is a continuation-in-part application of U.S. Ser. No. 426,205, filed on Sept. 28, 1982, now abandoned.

FIELD OF THE INVENTION

The present invention relates to a method of recovering metals from industrial by-products. More particularly, the invention relates to a method capable of efficient selective recovery of copper and arsenic from industrial by-products such as flue dusts and residues produced in smelters that contain not only copper and arsenic but also at least one of lead, zinc, iron, silver and cadmium. The invention also relates to a method that recovers other metals individually.

BACKGROUND OF THE INVENTION

In recovering valuable metals from industrial by-products such as flue dusts and various residues that contain not only copper and arsenic but also other metals such as lead, zinc, iron, silver and cadmium, various different methods are used depending upon the lead content and whether the predominant forms of the metals present are oxides (or sulfates) or sulfides. If the metals are in the form of oxides or sulfates, leaching with sulfuric acid is the common method and to be effective, it requires a fairly high lead content. Flue dusts for instance that meet these requirements are leached with sulfuric acid to dissolve out copper, zinc, iron, arsenic and cadmium, with lead being precipitated in the form of a lead sulfate in combination with silver to be used as a feed for lead smelting. The dissolved copper is reacted with hydrogen sulfide to form copper sulfide, or alternatively it is replaced with metallic iron to be separated as precipitated copper for use as a feed for copper smelting. Iron and arsenic remained in the solution are neutralized, oxidized with air and removed as stable arsenic and iron compounds. Zinc is neutralized with ammonia to a hydroxide which is separated and used as a feed for zinc smelting. Cadmium is reacted with hydrogen sulfide to form cadmium sulfide which is used as a feed for cadmium smelting. This method is already in commercial application.

But if this method is applied to by-product materials mainly comprising metals in the form of oxides or sulfates but having a small lead content, metals such as copper and zinc are dispersed rather than concentrated in the leaching residue, and whether the metal to be recovered is lead or copper, a complex procedure is necessary and great loss results. Since most of silver moves together with lead, residue must be treated to recover silver in spite of its low lead content. Even if silver can be recovered by this method, it is still uneconomical because the concentrations of copper and other metals in this residue are low.

SUMMARY OF THE INVENTION

Therefore, one object of the present invention is to provide an economical and efficient method that selectively recovers copper and arsenic as well as other various metals from industrial by-products irrespective of the lead content and whether the metals are in the form of oxides or sulfides. To achieve this object, we have made various studies and found that such industrial by-products can be leached with sulfuric acid very efficiently by transferring almost all part of copper in the leaching residue rather than to the solution after leaching (hereunder "leach solution").

The present invention provides a method of recovering valuable metals from industrial by-products that contain copper and arsenic and at least one metal selected from the group consisting of lead, zinc, iron, silver and cadmium, at least part of said copper being present as acid-soluble copper in the form of oxides and/or sulfate, wherein the by-products are leached with sulfuric acid in an $SO_2$ gas atmosphere at a temperature of 70° C. or more preferably 100°–150° C., and most preferably 110°–120° C. in the presence of a solid sulfide or sulfur which is at least equal in a molecular ratio to the acid-soluble copper in the by-products, to thereby precipitate copper selectively as copper sulfide while dissolving at least one metal selected from the group consisting of zinc, iron, arsenic and cadmium in the leach solution, the precipitate being subsequently separated from the leach solution.

Another object of the present invention is to provide a useful and convenient method for recovering arsenic from industrial by-products in which arsenic is highly concentrated. Generally, the arsenic content of raw material used in smelters is very low. However, since arsenic sublimates or evaporates very easily, it is often concentrated in a smelter flue dust. However, since flue dust is a complicated mixture of a number of metal compounds, it is sometimes rather difficult to deal with it separately. Thus, flue dust is often used by mixing it with a large amount of the smelter raw material, in other words, it is diluted with the raw material. If we do this, however, the arsenic which was at one point highly concentrated in the flue dust will again be dispersed. Thus, if a method can be found which enables the recovery of arsenic from such flue dust economically by processing the flue dust separately irrespective of its composition, it must be very useful. The process of the present invention will answer to such requirement.

A further object of the present invention is to provide a useful method which enables the efficient collection of silver in a copper-containing precipitate irrespective of the lead content of the industrial by-product to be treated.

Further objects of the present invention will become obvious from the description hereinbelow and the appended claims.

These and other objects of the present invention can be accomplished by the novel method of the present invention which will be explained below in detail.

Typically, the method of the present invention can be given as follows.

"A method of recovering valuable metals from an industrial by-product that contains copper and arsenic, and at least one metal selected from the group consisting of lead, zinc, iron, silver and cadmium, at least part of said copper being present as acid-soluble copper in the form of oxides and/or sulfate, said method comprising the steps of:

(1) leaching the by-product with sulfuric acid in an $SO_2$ gas atmosphere at a temperature of at least 70° C., preferably 100°–150° C. and most preferably 110°–120° C., in the presence of an amount of a solid sulfide or sulfur at least equal in molecular ratio to said acid-soluble copper in the by-product, to thereby selectively precipitate substantially all copper contained in said by-product as copper sulfide in the form of a copper-containing precipitate and to form a filtrate containing substantially no copper and having dissolved therein at least one metal selected from the group consisting of arsenic, zinc, iron and cadmium;

(2) separating the copper-containing precipitate by filtration from the filtrate under conditions which do not cause the arsenic present in the filtrate to crystallize as arsenious acid;

(3) cooling or concentrating the resulting filtrate to thereby precipitate crystals of arsenious acid; and (4) separating the precipitated arsenious acid crystals from the filtrate."

In connection with our object mentioned above, some prior art references have been known to us, which include U.S. Pat. No. 4,290,865 issued on Sept. 22, 1981 to Baczek et al, Affinerie's British Pat. No. 372,189, completely accepted on May 5, 1932 and No. 368,316, completely accepted on Mar. 3, 1932. However, none of these prior art references can teach or suggest the novel idea of the present invention for reasons which will be explained in detail hereinbelow.

In the method of the present invention, the leaching step is conducted by reacting the by-product with sulfuric acid in an $SO_2$ gas atmosphere in the presence of a specified amount of solid sulfide or sulfur. As a result of this leaching process, substantially all of the copper contained in the by-product is precipitated as copper sulfide leaving a filtrate which contains substantially no copper. The present invention is directed to a method of recovering valuable metals from an industrial by-product that contains copper and arsenic and/or other specified metals. The recovery of arsenic from such industrial by-products has been difficult based on prior art techniques. Applicants have discovered a unique method of recovering arsenic and other metals from an industrial by-product that is both simple to perform and much less costly than prior art methods including those disclosed in the prior art references as mentioned above.

One of the features of the present process is a leaching process wherein the by-product is reacted with sulfuric acid in an $SO_2$ gas atmosphere at a temperature of at least 70° C. in the presence of an amount of a solid sulfide at least equal in molecular ratio to the acid-soluble copper contained in the industrial by-product. As a result of these process conditions, a precipitate is formed which includes substantially all of the copper which was contained in the by-product. The copper precipitates as copper sulfide. The precipitation of copper leaves a filtrate which contains substantially no copper. The filtrate contains in dissolved form minor amounts of other valuable metals which are to be recovered from the by-product.

Baczek et al discloses a process for recovering copper from a contaminated copper-bearing source such as a copper smelter flue dust. The copper-bearing source is leached in sulfuric acid to dissolve all of the copper in the form of a copper sulfate solution. Then, by filtration, residue comprising undissolved compounds such as $PbSO_4$ and Ag is separated from the leach solution which primarily contains a relative large amount of copper ions. The copper sulfate solution is then treated with chalcopyrite and sulfur dioxide to precipitate copper in the form of copper sulfides from the solution which primarily contains impurities such as Zn, As, Fe, Cd, etc.

Column 3, lines 12–22 of the reference discloses that the leaching procedure is conducted in a number of stages depending upon the composition of the feed material. The more refractory the feed material, the more stages that will be required. Successive stages employ increasing amounts of acids to product a copper sulfate solution. Sulfur dioxide and chalcopyrite are only added after removal of undissolved residue and formation of the copper-containing solution as shown in FIG. 1.

In Baczek et al "leaching" is carried out to dissolve substantially all copper from the raw material. Irrespective of whether the copper is contained in the form of sulfides or oxides, all of the copper must be dissolved in the solution. Leaching must be carried out as completely as possible and, as preciously shown in column 3, lines 12–22, in order to accomplish this result, leaching is carried out in multiple states.

In contradistinction, the present process does not dissolve metal sulfides or other acid-insoluble components to form a leach solution. Only easily dissolved acid soluble components are dissolved. Among these components, any copper oxide which is dissolved in the leach solution is immediately precipitated as a result of reaction with the solid sulfide which is present with the sulfuric acid and $SO_2$ gas. As a result of the present process, the leach solution contains only easily dissolved acid soluble impurities such as arsenic, zinc, iron, etc. Filtration of the leach solution is easy to accomplish since the acidity of the solution is high and the filtrate contains substantially no copper compounds since copper compounds are precipitated in the leaching step of the present process. Furthermore, washing is also easy to perform since the amount of metallic iron dissolved in the leach solution is relatively small. On the other hand, the Baczek et al process requires a more thorough washing procedure since the leach solution contains a large amount of copper ions. This is one of the reasons why the present process achieves improved separation of arsenic from copper when a copper-bearing flue dust is treated in accordance with the present invention.

As previously indicated, the present process does not dissolve refractory copper compounds present in the by-product raw material as required in Baczek et al. Instead, copper compounds are collected in the form of a precipitate along with other acid insoluble metal compounds such as lead sulfate. Thus, the precipitate is mainly formed of copper sulfide and lead sulfate. The recovery of copper from lead in the precipitate is easy to accomplish in a conventional manner. Furthermore, if the content of copper is relatively high, the precipitate can be used as a raw material for copper smelting. If the lead content is high, the precipitate may be used as a raw material for lead smelting. In any event, separation of copper from lead is readily accomplished by conventional techniques.

Baczek et al requires, after completion of the multiple stage leaching technique, that the precipitate comprising undissolved compounds such as lead sulfate and silver is separated from the leach solution which contains a relatively large amount of copper ions. The solution is treated in the precipitation step (see FIG. 1) wherein copper ions in the solution are precipitated by adding chalcopyrite. Then the solution is filtered again to separate the precipitate comprising the copper sulfides from the solution which contains impurities such as zinc, arsenic, iron, cadmium etc. The resulting precipitate is treated to recover copper and the filtrate is treated to recover various valuable metal components therefrom.

In contrast, the process of the present invention employs a single leaching procedure and also needs to employ only a single filtration step. As a result, complete separation of the acid-soluble components (zinc, iron arsenic, cadmium, etc.) from acid-insoluble components (copper, lead, silver, etc.) can be effectively made as shown in Table 1. Thus, in accordance with the present invention, impurities such as arsenic which are normally difficult to separate from copper can be separated from copper very easily.

In the process of Baczek et al, the presence of ferric ions adversely affects precipitation of copper. Thus, the introduction of $SO_2$ must be delayed until the concentration of ferric ions in the copper containing solution is reduced. In the process of the present invention, $SO_2$ is utilized immediately because the presence of ferric ions does not adversely affect the precipitation of copper.

A further distinction between the present invention and that of Baczek et al is that the reference requires the use of "chalcopyrite" while the present invention may employ any solid sulfide and does not require the use of chalcopyride. For example, if a mixture of two different kinds of copper bearing flue-dust is used (one rich in copper oxides and another rich in copper sulfides), any suitable solid sulfide may be employed. Baczek et al on the other hand, requires the use of chalcopyrite and therefore is directed to a much more limited process.

In addition, if a raw material contains a substantial amount of Pb and Ag, Baczek tries to separate Pb and Ag from copper in the leaching step. In the present invention, Pb and Ag are intentionally mixed with copper to produce a precipitate containing each of these materials.

There are, further differences between the present invention and that disclosed by Baczek et al. The reference process is generally carried out at a temperature of about 80° C. under atmospheric pressure for between 4 and 6 hours (column 2, lines 44-46). In contrast, the process of the present invention is preferably carried out at a temperature of 100°-150° C., more preferably 110°-120° C., under pressure for about three hours (e.g. Example 1). Furthermore, in the present process, the arsenic content of the precipitate can be controlled by controlling the partial pressure of sulfur dioxide as mentioned hereinbefore. There is no disclosure in Baczek et al of this concept.

The Affinerie patents are directed to a process for the recovery of arsenic in the form of arsenious acid from by-products containing the same. There is no disclosure in these references of applicants' leaching process wherein the industrial by-product is contacted with sulfuric acid in an $SO_2$ gas atmosphere in the presence of a specified amount of solid sulfide. The references are concerned only with removing arsenic and provide no suggestion to one of ordinary skill in the art to amend the teachings of Baczek et al to arrive at the present invention.

More specifically, Example II of Affinerie '189 describes the treatment of an industrial by-product containing copper. The by-product is treated with sulfuric acid and liquid $SO_2$ in a closed saturator at ordinary temperature. The resulting arsenious acid is crystallized out and filtered off. The filtrate contains sulfuric acid and copper which must be removed by electrolysis. In contradistinction, the present invention requires precipitation of substantially all of the copper leaving a filtrate which contains substantially no copper.

BRIEF DESCRIPTION OF THE DRAWINGS

FIGS. 1A and B is a flow sheet of one embodiment of the method of the present invention.

DETAILED DESCRIPTION OF THE INVENTION

Figure 2:
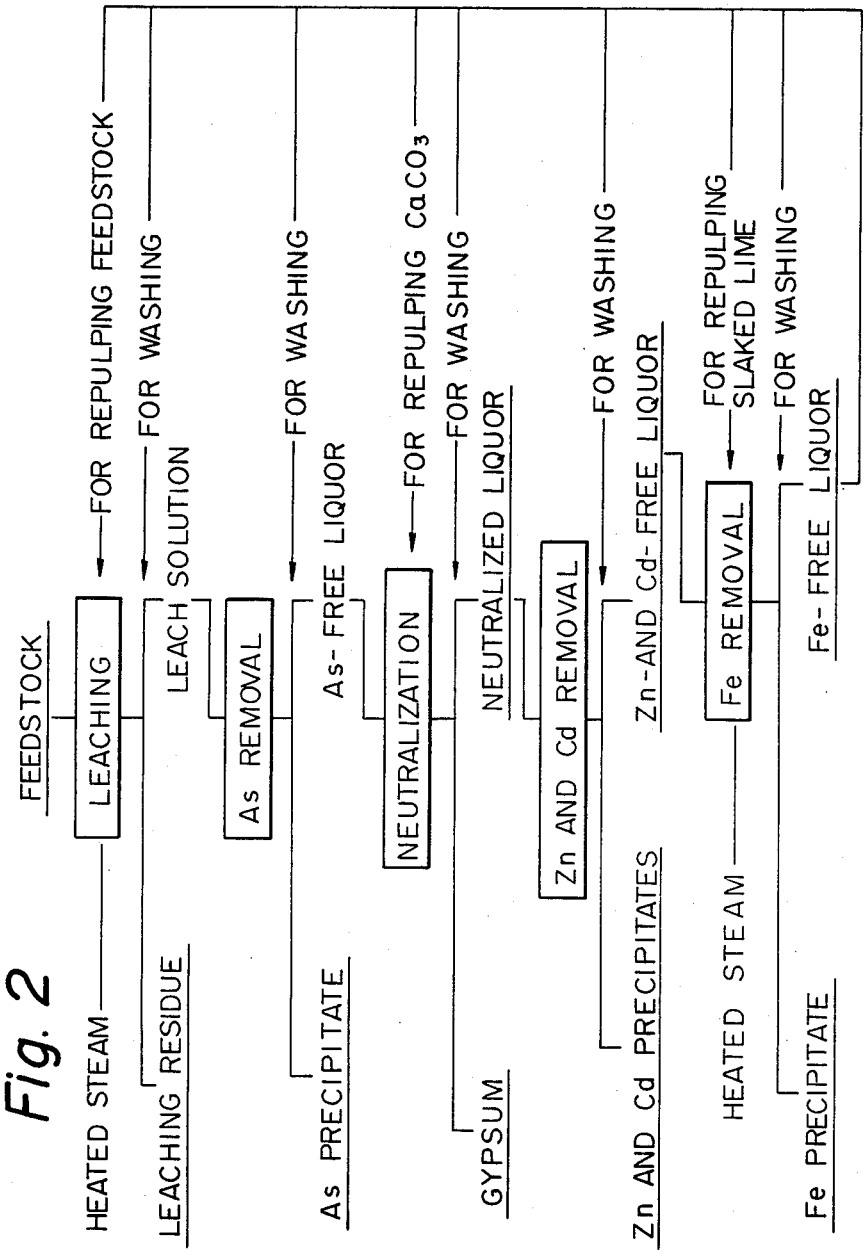
FIG. 2 is a flow sheet of an embodiment wherein the method of the present invention is practiced in a closed system.

The solid sulfide in the presence of which an industrial by-product is leached with sulfuric acid may originate from the by-product per se, but if it is not originally present in the by-product or if its content is very small (i.e. the by-product contains metals predominantly in the form of oxides or sulfates), the solid sulfide may be supplied in the form of copper concentrate or sulfur. The use of copper concentrate is preferred since impurities such as iron, zinc and arsenic dissolve out in the leach solution and a precipitate of highly concentrated copper sulfide is produced, hence achieving further enhancement of the grade of the copper concentrate. If sulfur is used, the by-product is desirably heated at a temperature of not more than 120° C. to prevent the fusion of sulfur.

It is advantageous from the viewpoint of a practical operation that the solid sulfide is made to coexist with raw material to be treated during the leaching with sulfuric acid under the conditions defined by the present invention. Heating in an $SO_2$ gas atmosphere to a temperature of 70° C. or higher is preferably effected in an autoclave.

According to the method of the present invention, copper can be selectively precipitated as copper sulfide, and this is the basic feature of the present invention. The reactions involved in the precipitation of copper as copper sulfide are believed to be as follows.

When copper concentrate is used as the solid sulfide:

$$2CuFeS_2 + 3CuSO_4 + 2SO_2 + 4H_2O \rightarrow Cu_5FeS_4 + 4H_2SO_4 + FeSO_4$$

$$Cu_5FeS_4 + 3CuSO_4 + 2SO_2 + 4H_2O \rightarrow 4Cu_2S + 4H_2SO_4 + FeSO_4$$

$$CuFeS_2 + CuSO_4 \rightarrow 2CuS + FeSO_4$$

$$Cu_5FeS_4 + CuSO_4 \rightarrow 2Cu_2S + 2CuS + FeSO_4$$

$$5CuS + 3CuSO_4 + 4H_2O \rightarrow 4Cu_2S + 4H_2SO_4$$

$$CuSO_4 + CuS + SO_2 + 2H_2O \rightarrow Cu_2S + 2H_2SO_4$$

When sulfur is used as the solid sulfide:

$$CuSO_4 + S° + SO_2 + 2H_2O \rightarrow CuS + 2H_2SO_4$$

$$CuSO_4 + CuS + SO_2 + 2H_2O \rightarrow Cu_2S + 2H_2SO_4$$

By following these reactions, substantially all copper once dissolved in the leach solution is precipitated as copper sulfide and can be selectively separated from other metals such as iron, arsenic and zinc that remain dissolved in the leach solution.

If the metals in the by-product are predominantly in the form of sulfides, there is no need to add a solid sulfide, and the by-product may be directly leached with sulfuric acid in an $SO_2$ gas atmosphere at a temperature of 70° C. or more. A by-product that contains metals predominantly in the form of sulfides but which has a small lead content cannot be effectively leached with sulfuric acid by the conventional method and the residue contains copper, arsenic, zinc, iron and other metals. This residue contains too little copper and too much zinc, iron, arsenic and lead to be used as a feed for copper smelting. On the other hand, the residue contains too little lead and too much copper to be used as a feed for lead smelting. But in the present invention, almost all copper is transferred to the precipitate to provide a residue of high copper concentration which is substantially free from metals such as zinc, iron or arsenic, because these remain dissolved in the leach solution. Arsenic is a disadvantageous element for the purpose of copper smelting, so separability of arsenic from copper is a great merit when the leaching residue is used as a feed for copper smelting. In other words, the method of the present invention is very suitable for use in the treatment of industrial by-products having high arsenic content.

In the practice of the present invention, the behavior of metal ions, particularly, arsenic, in the leach solution is greatly influenced by the leaching atmosphere. If the partial pressure of sulfur dioxide is high, the leaching residue contains much arsenic but if the partial pressure of sulfur dioxide is reduced by, say, dilution with air, a residue containing less arsenic is produced. Therefore, to provide optimum results in leaching, a suitable partial pressure of $SO_2$ must be selected according to the specific by-product to be leached. As is clear from the reaction formulas given before, the amount of the solid sulfide in the presence of which the by-product is leached must theoretically be at least equal to the amount of copper in the by-product in terms of molecular ratio. But in some by-products, the metal components are not always fixed in amounts of their respective forms, that is, the proportion of the oxide (or sulfate salt) to sulfide varies arbitrarily, and so, if the amount of metals that are present in the form of sulfides is not satisfactory, proper amount of solid sulfide must be added to the by-product from the external source. The solid sulfide is preferably in a finely powdered form to provide a large active surface area. Treatment with the solid sulfide is effected at a temperature of at least 70° C., preferably between 100° and 150° C., but if sulfur is used as the solid sulfide, the temperature is preferably not more than 120° C.

As described above, the present invention provides a simple and effective recovery of copper from by-products by selectively precipitating copper while causing iron, arsenic and zinc to dissolve out in the leach solution, and this is accomplished irrespective of the lead content and whether the metals are in the form of oxides or sulfides. Lead and silver are also transferred to the residue without dissolving out in the leach solution, so the present invention is also capable of silver recovery by using the residue as a feed for lead smelting if it is rich in lead and using it as a feed for copper smelting if it is lean in lead.

The above described procedure may be called a step of leaching and removal of copper, and the valuable metals remained in the leach solution can be recovered by the following sequence of steps.

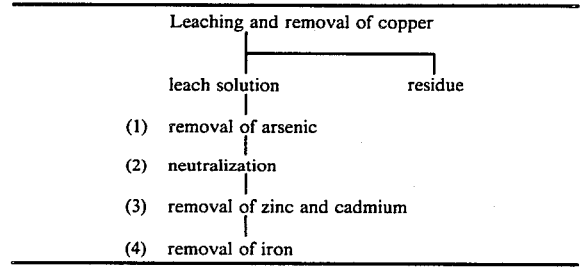

In the pages that follow, these four steps are described in the order of their practice. A flow sheet of the entire process is shown in FIG. 1.

(1) Removal of arsenic

The leach solution contains zinc, iron and arsenic in high concentrations, and arsenic is dissolved out as arsenious acid. Since the solubility of arsenious acid depends on temperature, it can be crystallized by cooling the leach solution. In actual practice, the leached pulp is filtered while it is not to prevent premature crystallization of arsenious acid, and then the filtrate is cooled to provide a pure arsenious acid crystal. This method avoids contamination by copper and provides pure arsenious acid since in the previous leaching-and-copper removing step, copper was completely removed from the leach solution and no substantial precipitation of copper sulfate will take place. Dissolved arsenic is commonly removed by reacting it with hydrogen sulfide to form an arsenic sulfide precipitate, and compared with this conventional method, the one used in the present invention is a bit ineffective in removal of arsenic, but this can be compensated by also using the conventional method. Among the advantages of combining the two methods over using only the conventional method are the following: (1) since the greater part of arsenic is directly produced as arsenious acid, less hydrogen sulfide is necessary, and (2) the size and operating cost of an apparatus for roasting the arsenic sulfide (as produced by reaction with hydrogen sulfide) and recovering it as arsenious acid are reduced.

Therefore, according to the present invention, part of the arsenic in the leach solution is removed as the arsenious acid crystal and the remaining arsenic is reacted with hydrogen sulfide gas and removed as a sulfide. The reaction for the formation of arsenic sulfide proceeds quickly at low pH, so the step of removing arsenic is performed between the leaching step and the neutralizing step described below. The volume of hydrogen sulfide gas to be blown is controlled by the redox potential of the leach solution.

(2) Neutralization

The leach solution from which arsenic has been removed is neutralized by a conventional method, i.e. addition of calcium carbonate. If gypsum is to be subsequently discarded and if there is no need of recovering zinc and cadmium from the leach solution, the neutralizing step may be directly followed by removal of iron. We compared the case wherein the neutralization step was immediately followed by removal of iron and the case wherein removal of zinc and cadmium was effected between the two steps, and have found the following: (a) there was no difference in the amount of calcium carbonate used, (b) the former case used more slaked lime and produced more precipitate (a mixture of gypsum and iron precipitates in contract with the sum of gypsum and iron precipitate obtained in the latter case), and (c) there was little difference in the concentration of heavy metal ions in the filtrate from which iron was removed.

(3) Removal of zinc and cadmium

By reacting zinc and cadmium with hydrogen sulfide gas to form the respective sulfides, about 80% of zinc and almost all cadmium can be removed as precipitates, the exact amount varying with the concentration of the metal ions in the leach solution. Zinc and cadmium can be completely removed by blowing hydrogen sulfide at an elevated pH.

(4) Removal of iron

Iron in solution is conventionally removed by one of the following two methods:

1. Goethite method: The more common method, wherein the solution whose pH is controlled by calcium carbonate at about 4.8 is oxidized with air at an elevated temperature of about 50° C., whereupon the dissolved ferrous ion is oxidized and precipitated as FeO(OH). The reactions involved in this method are represented by the following scheme:

$$2Fe(SO_4) + \tfrac{1}{2}O_2 + H_2SO_4 \rightarrow Fe_2(SO_4)_3 + H_2O$$

$$Fe_2(SO_4)_3 + 4H_2O \rightarrow 2FeO(OH) + 3H_2SO_4$$

If the concentration of iron in the solution is high, several problems occur, such as increased precipitate, increased pulp concentration in the precipitate which hence becomes difficult to handle, and prolonged dwell time in aerial oxidation.

The potential vs. pH diagram tells that the oxidation of ferrous ions proceeds faster in a high pH range, but in the experiment conducted by us, there was no substantial change in the time for completing oxidation of ferrous ions even when the pH was increased up to about 8.

2. Hematite method: This method has two advantages; ferrous ions can be separated out as high-purity iron oxide without causing coprecipitation of zinc or cadmium, and sulfuric acid can be regenerated. The reaction involved in this method and which is represented by the following scheme is effected in an oxygen atmosphere at 200° C. and 20 kg/cm²:

$$2FeSO_4 + \tfrac{1}{2}O_2 + 2H_2O \rightarrow Fe_2O_3 + 2H_2SO_4$$

The iron oxide crystal formed in this method has small volume, so there is no possibility that the pulp concentration becomes too great even if the solution to be treated has high iron concentrations. The product has high purity of iron oxide and is of great commercial value. But one great problem with this method is relatively high equipment and operation cost.

To overcome the defects of the two methods, we have developed a new method of iron removal that is based on the reaction for the formation of a magnetite precipitate. In this method, ferrous ions in the solution are oxidized and precipitated as $Fe_3O_4(FeO.Fe_2O_3)$. Among the merits of the new method are shorter reaction period and fewer heavy metals remaining in the filtrate than in the Goethite method, and lower equipment and operating cost than in the Hematite method. The reaction involved in this method is represented by the following scheme:

$$Fe(OH)_2 + 2Fe(OH)_3 \rightarrow FeO + Fe_2O_3 + 4H_2O \rightarrow Fe_3O_4 + 4H_2O$$

As shown above, to form a magnetite precipitate, this method requires only two thirds of the dissolved ferrous ions to be oxidized, and as a result, oxygen consumption is smaller and oxidation period is shorter than in the Goethite method.

In the course of this reaction, a greenish blue precipitate comprising ferrous hydroxide is first formed, and as magnetite is formed, the precipitate turns black, and at the end of the reaction, the precipitate is black and a transparent filtrate is formed. Zinc, cadmium and a trace of arsenic present in the neutralized leach solution are coprecipitated with magnetite. This reaction is also dependent on temperature, and the reaction rate is increased at a fairly high temperature (70° C. or more), and a temperature of 80° C. or more is preferred. A pH of 8.0 or more is suitable for practical purposes. The amount of air necessary for oxidation and the length of the reaction period depend on the contents of iron and other metal ions in the leach solution. We found that the rate of oxidation of iron was increased by using a leach solution that has been freed of zinc and cadmium. Zinc or cadmium ion in the solution is believed to inhibit the oxidation of ferrous ions. If the concentration of zinc or cadmium ion exceeds a certain level or if aerial oxidation is insufficient, the dissolved iron is precipitated not as magnetite but as a hydroxide. Even in this case, no iron is left in the filtrate, but under certain conditions, the iron precipitate may dissolve out again in the solution.

According to the present invention, all steps of treating solutions including the step of leaching and removal of copper up to the step of removal of iron can be incorporated in a closed system so that no waste water is discharged from the system, and this is highly desired for preventing water pollution. One embodiment of this closed system is shown in the flow sheet of FIG. 2. The basic concept of this system is to use the iron-free leach solution for washing the residue in each filtering step and for repulping the feedstock (by-product to be treated) as well as the respective neutralizing agents, to thereby save the use of fresh water. According to this system, incidental deleterious elements such as fluorine, chlorine, sodium, potassium and magnesium are discharged from the system together with the filtration residue. For instance, chlorine, sodium and potassium supplied from flue dusts are discharged in each step together with the filtration residue, except for a certain amount remaining in the leach solution. At the same time, 20 to 40% of magnesium and 70 to 80% of fluorine are discharged together with the iron precipitate produced in the step of removing iron, and will not be concentrated in the circulating water.

Typical examples of the method of the present invention are described, but the scope of the invention is by no means limited to these examples.

EXAMPLE 1

A mixture of smelter flue dusts comprising oxides and sulfates of copper, lead, zinc, iron, arsenic and silver and those comprising sulfides of the respective metals was repulped with an acidic aqueous solution of sulfuric acid and leached in an $SO_2$ atmosphere at between 110° and 120° C. under pressure and agitation.

The composition of the feedstock and auxiliary materials, as well as the reaction conditions are listed below.

Composition of feedstock and auxiliary materials (by weight ratio):

| Flue dusts | | 1 |
|---|---|---|
| Auxiliary materials | H$_2$SO$_4$ | 0.4 |
| | H$_2$O | 3.0 |
| | SO$_2$ gas | 0.01 |

Reaction conditions:
 Period: 3 hr.
 Temperature: 110°–120° C.
 Pressure: 5–6 kg/cm$^2$ at max.

To prevent copper from dissolving out in the leach solution, the ratio of the sulfides to oxides or sulfates in the feedstock was held at a proper constant value, and if any residual copper was found in the leach solution, flue dusts rich in sulfides, copper concentrate, sulfur etc., were added as required. The results of the treatment are shown in Table 1.

TABLE 1

| | wt. ratio | Composition (% or g/l) | | | | | | Distribution (%) | | | | | |
|---|---|---|---|---|---|---|---|---|---|---|---|---|---|
| | | Cu | Pb | Zn | Fe | As | Cd | Cu | Pb | Zn | Fe | As | Cd |
| flue dust predominantly consisting of oxides and sulfates | 1 | 15.8 | 2.8 | 2.6 | 13.8 | 6.8 | 0.1 | 21 | 28 | 18 | 21 | 27 | 33 |
| flue dust predominantly consisting of sulfides | 3 | 20.0 | 2.4 | 4.0 | 17.0 | 6.3 | 0.1 | 79 | 72 | 82 | 79 | 73 | 67 |
| leach solution | 15 | 0.01 | — | 8.8 | 43.7 | 16.4 | 0.2 | 0 | 0 | 88 | 99 | 94 | 85 |
| residue | 1.9 | 40.6 | 5.4 | 0.9 | 0.4 | 0.9 | 0.04 | 100 | 100 | 12 | 1 | 6 | 15 |

EXAMPLE 2

Smelter flue dusts comprising oxides and sulfates of copper, lead, zinc, iron, arsenic and silver were mixed with copper concentrate, and the mixture was repulped with an acidic aqueous solution of sulfuric acid and leached in an SO$_2$ atmosphere at between 110° and 120° C. under pressure and agitation.

Composition of feedstock and auxiliary materials (by weight ratio):

| Flue dusts | | 1 |
|---|---|---|
| Copper concentrate | | 3 |
| Auxiliary materials | H$_2$SO$_4$ | 1.7 |
| | H$_2$O | 13.0 |
| | SO$_2$ gas | 0.04 |

Reaction conditions:
 Period: 3 hr.
 Temperature: 110°–120° C.
 Pressure: 5–6 kg/cm$^2$ at max.

To prevent copper from dissolving out in the final leach solution, the ratio of the flue dust to copper concentrate in the feedstock was held a proper constant value, and if any copper ion was found in the final leach solution, copper concentrate was added as required. The results of the treatment are shown in Table 2.

TABLE 2

| | wt. ratio | Composition (% or g/l) | | | | | Distribution (%) | | | | |
|---|---|---|---|---|---|---|---|---|---|---|---|
| | | Cu | Pb | Zn | Fe | As | Cu | Pb | Zn | Fe | As |
| flue dust | 1 | 14.7 | 3.2 | 2.9 | 13.3 | 8.4 | 18 | 68 | 12 | 17 | 74 |
| Cu concentrate | 3 | 22.5 | 0.5 | 6.9 | 20.9 | 0.95 | 82 | 32 | 88 | 83 | 26 |
| leach solution | 15 | 0.002 | — | 5.0 | 18.3 | 5.9 | 0 | 0 | 31 | 36 | 78 |
| residue | 3 | 26.7 | 2.0 | 5.5 | 16.2 | 0.81 | 100 | 100 | 69 | 64 | 22 |

EXAMPLE 3

A mixture of smelter flue dusts (250 g) of the composition indicated in Table 3 and sulfides (730 g) primarily composed of copper concentrate and having the composition also indicated in Table 3 was repulped with an acidic aqueous solution of sulfuric acid and leached in an SO$_2$ atmosphere at between 110° and 120° C. for 3 hours under pressure and agitation. The results are shown in Table 3.

TABLE 3

| | amount (l, kg) | Composition (g/l or %) | | | | Content (g) | | | |
|---|---|---|---|---|---|---|---|---|---|
| | | Cu | Zn | Fe | As | Cu | Zn | Fe | As |
| flue dust | 0.25 | 16 | 2 | 14 | 7 | 39 | 6 | 34 | 17 |
| sulfides | 0.7 | 21 | 4 | 18 | 7 | 146 | 29 | 123 | 46 |
| leach solution | 3.5 | 0.01 | 9 | 44 | 18 | 0 | 32 | 155 | 62 |
| residue | 0.5 | 37 | 0.6 | 0.4 | 0.2 | 185 | 3 | 2 | 1 |
| distribution in the residue | | | | | | 100 | | | |

EXAMPLE 4

The Cu-free leach solution obtained in Example 1 was subjected to removal of arsenic, neutralization, removal of zinc and cadmium and removal of iron under the conditions indicated below according to the flow sheet of FIG. 1.

Removal of arsenic:
 Eh: +100 mV (bubbled with H$_2$S)
 Temperature: 40° C.
 Reaction period: 2 hr
Neutralization:
 pH: 2.0
 Reaction period: 1 hr
 Neutralizing agent: calcium carbonate
Removal of zinc and cadmium:
 pH: 2.0
 Reaction temperature: 40° C.
 Reaction period: 1 hr
 Sulfurizing agent: hydrogen sulfide gas
Removal of iron:
 pH: 8.0
 Eh: −450 to −360 mv
 Reaction temperature: 80° C.
 Neutralizing agent: slaked lime Reaction period: 6 hr
Air supply for oxidation: 3 liters/min.

The composition and percent distribution of the liquors and precipitates obtained in the respective steps are shown in Table 4. The rate of removal of Zn and Cd is increased at higher pHs, but in Example 4, the neutralized liquor having a pH of 2.0 was immediately subjected to the removal of Zn and Cd.

TABLE 4

| leaching and Cu-removing |
|---|

↓         ↘ residue
 leach solution

| As removal |

| | wt. ratio | Composition (% or g/l) | | | | Distribution (%) | | | |
|---|---|---|---|---|---|---|---|---|---|
| | | Zn | Fe | As | Cd | Zn | Fe | As | Cd |
| As-free solution | 15 | 8.7 | 43.6 | 0.001 | 0.1 | 88 | 99 | — | 35 |
| As precipitate | 0.5 | 0.1 | 0.1 | 52.0 | 0.43 | — | — | 94 | 50 |

| neutralization |

| | wt. ratio | Composition (% or g/l) | | | | Distribution (%) | | | |
|---|---|---|---|---|---|---|---|---|---|
| | | Zn | Fe | As | Cd | Zn | Fe | As | Cd |
| neutralized liquor | 19 | 6.8 | 34.0 | 0.001 | 0.1 | 88 | 99 | — | 30 |
| gypsum | 1.5 | 0.01 | 0.01 | 0.005 | 0.005 | — | — | — | 5 |

| Zn and Cd removal |

| | wt. ratio | Composition (g/l or %) | | | | Distribution (%) | | | |
|---|---|---|---|---|---|---|---|---|---|
| | | Zn | Fe | As | Cd | Zn | Fe | As | Cd |
| Zn- and Cd-free liquor | 19 | 1.3 | 32.8 | 0.001 | 0.001 | 18 | 99 | — | — |
| Cd precipitate | 0.2 | 61.5 | 0.04 | 0.005 | 0.7 | 70 | — | — | 30 |

| Fe removal |

| | wt. ratio | Composition (ppm for liquor and % for precipitate) | | | | Distribution (%) | | | |
|---|---|---|---|---|---|---|---|---|---|
| | | Zn | Fe | As | Cd | Zn | Fe | As | Cd |
| Fe-free liquor | 25 | 1.0 | 2 | 0.1 | 0.01 | — | — | — | — |
| Fe precipitate | 3 | 0.9 | 22.8 | 0.005 | 0.0003 | 18 | 99 | — | — |

EXAMPLE 5

Examples 1 and 4 were repeated in a closed system according to the flow sheet of FIG. 2. The composition of typical products and the overall water balance are shown in Tables 5 and 6, respectively.

TABLE 5

The composition of typical products

| | Composition (%) | | | | | | | |
|---|---|---|---|---|---|---|---|---|
| | Cu | Pb | Zn | Fe | As | Bi | Sb | Cd |
| leaching residue | 39.1 | 6.7 | 1.2 | 0.4 | 0.2 | 0.5 | 0.1 | 0.1 |
| As precipitate | — | — | 0.2 | 0.1 | 52.4 | 1.6 | 0.2 | 0.7 |
| gypsum | — | — | — | 0.02 | — | — | — | — |
| Cd precipitate | — | — | 61.2 | 0.04 | — | — | — | 1.2 |
| Fe precipitate | — | — | 1.1 | 16.3 | — | — | — | — |

TABLE 6

Overall water balance (%)

| Water input | | Water output | |
|---|---|---|---|
| flue dust water | 33 | water in leaching residue | 12 |
| steam blown to heat leaching tank | 16 | water in As precipitate | 9 |
| | | water in gypsum | 4 |
| steam blown to heat Fe removing tank | 51 | water of crystallization in gypsum | 6 |
| | | water in Cd precipitate | 3 |
| | | water in Fe precipitate | 50 |
| | | water of crystallization in Fe precipitate | 6 |
| | | water in steam from Fe removing tank | 10 |
| tot. | 100 | tot. | 100 |

What is claimed is:

1. A method of recovering valuable metals from an industrial by-product that contains copper and arsenic, and at least one metal selected from the group consisting of lead, zinc, iron, silver and cadmium, at least part of said copper being present as acid-soluble copper in the form of at least one of oxides and sulfate, said method comprising the steps of:

(1) leaching the by-product with sulfuric acid in an $SO_2$ gas atmosphere at a temperature of at least 70° C. in the presence of a solid sulfide or sulfur in an amount sufficient to precipitate all dissolved copper so as to maintain the solution substantially free of copper ions and to thereby selectively precipitate substantially all copper contained in said by-product as copper sulfide in the form of a copper-containing precipitate and to form a filtrate containing substantially no copper and having dissolved therein at least one metal selected from the group consisting of arsenic, zinc, iron and cadmium;

(2) separating the copper-containing precipitate by filtration from the filtrate under conditions which do not cause the arsenic present in the filtrate to crystallize as arsenious acid;

(3) cooling or concentrating the resulting filtrate to thereby precipitate crystals of arsenious acid; and (4) separating the precipitated arsenious acid crystals from the filtrate.

2. The method of claim 1 comprising simultaneously (a) cooling or concentrating the filtrate obtained from step (2) to thereby precipitate a first portion of arsenic contained in said filtrate as crystals of arsenious acid; and (b) adding hydrogen sulfide to the filtrate obtained from step (2) to thereby precipitate a second portion of arsenic contained in said filtrate as arsenic sulfide, and separating the precipitated crystals of arsenious acid and arsenic sulfide from the filtrate.

3. The method of claim 1 wherein the solid sulfide is copper concentrate.

4. The method of claim 1 wherein the solid sulfide is selected from the group consisting of sulfur and metal sulfide contained in the industrial by-product.

5. The method of claim 1 wherein the step of leaching the by-product with sulfuric acid in an $SO_2$ gas atmosphere is conducted at a temperature between 100° and 150° C.

6. A method of recovering valuable metals from an industrial by-product that contains copper and arsenic, and at least one metal selected from the group consisting of lead, zinc, iron, silver and cadmium, at least part of said copper being present as acid-soluble copper in the form of at least one of oxides and sulfate, said method comprising the steps of:
(1) leaching the by-product with sulfuric acid in an $SO_2$ gas atmosphere at a temperature of at least 70° C. in the presence of a solid sulfide or sulfur in an amount sufficient to precipitate all dissolved copper so as to maintain the solution substantially free of copper ions and to thereby selectively precipitate substantially all copper contained in said by-product as copper sulfide in the form of a copper-containing precipitate and to form a filtrate containing substantially no copper and having dissolved therein at least one metal selected from the group consisting of arsenic, zinc, iron and cadmium;
(2) separating the copper-containing precipitate by filtration from the filtrate under conditions which do not cause the arsenic present in the filtrate to crystallize as arsenious acid;
(3) adding hydrogen sulfide to said filtrate to thereby precipitate arsenic sulfide; and
(4) separating the precipitated arsenious sulfide from said filtrate.

7. The method of claim 6 wherein the industrial by-product is smelter flue dust.

8. A method of recovering valuable metals from an industrial by-product that contains copper and arsenic, and at least one metal selected from the group consisting of lead, zinc, iron, silver and cadmium, at least part of said copper being present as acid-soluble copper in the form of at least one of oxides and sulfate, said method comprising the steps of:
(1) leaching the by-product with sulfuric acid in an $SO_2$ gas atmosphere at a temperature of at least 70° C. in the presence of a solid sulfide or sulfur in an amount sufficient to precipitate all dissolved copper so as to maintain the solution substantially free of copper ions and to thereby selectively precipitate substantially all copper contained in said by-product as copper sulfide in the form of a copper-containing precipitate and to form a filtrate containing substantially no copper and having dissolved therein at least one metal selected from the group consisting of arsenic, zinc, iron and cadmium;
(2) separating the copper-containing precipitate from the filtrate;
(3) neutralizing the filtrate with a neutralizing agent so that the pH of the filtrate does not exceed 2.5 to thereby form a neutralized liquor;
(4) adding hydrogen sulfide gas to the neutralized liquor to thereby precipitate at least one sulfide selected from zinc sulfide and cadmium sulfide; and
(5) separating the precipitated sulfides from the neutralized liquor.

9. The method of claim 8 wherein the filtrate further contains arsenic and said method further comprises removing said arsenic from the filtrate after the step of separating the copper-containing precipitate from the filtrate.

10. The method of claim 8 wherein the industrial by-product is smelter flue dust.

11. The method of claim 8 wherein the solid sulfide is copper concentrate.

12. The method of claim 8 wherein the solid sulfide is selected from the group consisting of sulfur and metal sulfide contained in the industrial by-product.

13. The method of claim 8 wherein the step of leaching the by-product with sulfuric acid in an $SO_2$ gas atmosphere is conducted at a temperature between 100° and 150° C.

14. A method of recovering valuable metals from an industrial by-product that contains copper and arsenic, and at least one metal selected from the group consisting of lead, zinc, iron, silver and cadmium, at least part of said copper being present as acid-soluble copper in the form of at least one of oxides and sulfate, said method comprising the steps of:
(1) leaching the by-product with sulfuric acid in an $SO_2$ gas atmosphere at a temperature of at least 70° C. in the presence of a solid sulfide or sulfur in an amount sufficient to precipitate all dissolved copper so as to maintain the solution substantially free of copper ions and to thereby selectively precipitate substantially all copper contained in said by-product as copper sulfide in the form of a copper-containing precipitate and to form a filtrate containing substantially no copper and having dissolved therein at least one metal selected from the group consisting of arsenic, zinc, iron, and cadmium;
(2) separating the copper-containing precipitate from the filtrate;
(3) neutralizing the filtrate with a neutralizing agent so that the pH of the filtrate does not exceed 2.5 to thereby form a neutralized liquor;
(4) adding hydrogen sulfide gas into the first neutralized liquor to thereby precipitate at least one sulfide selected from zinc sulfide and cadmium sulfide;
(5) separating the precipitated sulfides from the first neutralized liquor to thereby form a second neutralized liquor;
(6) reacting the second neutralized liquor with air to thereby precipitate iron in the form of $Fe_3O_4$; and
(7) separating $Fe_3O_4$ from the second neutralized liquor.

15. The method of claim 14 wherein the filtrate further contains arsenic and said method further comprises removing said arsenic from the filtrate after the step of separating the copper-containing precipitate from the filtrate.

16. The method of claim 14 wherein the industrial by-product is smelter flue dust.

17. The method of claim 14 wherein the solid sulfide is copper concentrate.

18. The method of claim 14 wherein the solid sulfide is selected from the group consisting of sulfur and metal sulfide contained in the industrial by-product.

19. The method of claim 14 wherein the step of leaching the by-product with sulfuric acid in an $SO_2$ gas atmosphere is conducted at a temperature between 100° and 150° C.

* * * * *